(12) United States Patent
Tian et al.

(10) Patent No.: US 9,563,081 B2
(45) Date of Patent: Feb. 7, 2017

(54) FRAME SEAL STRUCTURE ON SUBSTRATE, SUBSTRATE, AND LIQUID CRYSTAL DISPLAY DEVICE

(71) Applicant: BOE TECHNOLOGY GROUP CO., LTD., Beijing (CN)

(72) Inventors: Biao Tian, Beijing (CN); Wei Guo, Beijing (CN); Ping Hu, Beijing (CN); Zhongyuan Sun, Beijing (CN); Zhao Kang, Beijing (CN); Xiangjun Tian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 32 days.

(21) Appl. No.: 14/526,446

(22) Filed: Oct. 28, 2014

(65) Prior Publication Data
US 2015/0338690 A1 Nov. 26, 2015

(30) Foreign Application Priority Data
May 23, 2014 (CN) ...................... 2014 2 0268327 U

(51) Int. Cl.
*G02F 1/1339* (2006.01)
*F16J 15/06* (2006.01)
(52) U.S. Cl.
CPC .............. *G02F 1/1339* (2013.01); *F16J 15/06* (2013.01)

(58) Field of Classification Search
CPC ..................................... G02F 1/1339
See application file for complete search history.

(56) References Cited

U.S. PATENT DOCUMENTS

2001/0012088 A1* 8/2001 Jeong .................... G02F 1/1339
349/153
2006/0176439 A1* 8/2006 Tashiro ................. G02F 1/1303
349/190

* cited by examiner

*Primary Examiner* — Phu Vu
(74) *Attorney, Agent, or Firm* — Blakely Sokoloff Taylor & Zafman LLP

(57) ABSTRACT

The present disclosure relates to the field of liquid crystal display, and particularly to a frame seal structure on a substrate, a substrate, and a liquid crystal display device. The frame seal structure comprises a primary seal and an assembly process dummy seal. The assembly process dummy seal is formed in an area between the primary seal and an edge of the substrate, and consists of a plurality of sub-seals which are arranged discontinuously. The present frame seal structure is a novel frame seal structure which is proposed with respect to drawbacks of the process dummy seal during assembling with a VIF process in a liquid crystal display device with post spacers. By virtue of the novel frame seal, the peripheral region of the substrate will not be pressed airtight during assembling, so that the gas can be discharged, and poor sealing in a certain area is avoided. Thus the present disclosure can solve the problem of poor pressing of frame seal, particularly the problems like seal brush and seal narrow, and can be better adapted to the VIF process and improve the yield.

11 Claims, 2 Drawing Sheets

FRAME SEAL STRUCTURE ON SUBSTRATE, SUBSTRATE, AND LIQUID CRYSTAL DISPLAY DEVICE

FIELD OF THE INVENTION

The present disclosure relates to the field of semiconductor and liquid crystal display device, and particularly to a frame seal structure on a substrate in a liquid crystal display device, a substrate, and a liquid crystal display device.

BACKGROUND ART

In a backlight source system of a liquid crystal display device, a vacuum infusion (VIF) process can be used to fabricate an array substrate. A sealant adopted in the VIF process is a mixture which contains epoxy resin as the main component and is further mixed with specific diluents. The sealant generally has a viscosity of 20-50 Pa·s, contains nonvolatile matter of 70%-90% by weight, and has a curing duration of 80-180 seconds at 150° C. Namely, it is necessary to perform thermal curing on the sealant during assembling.

In the VIF process, due to the design of a thermal pressing apparatus, a soft rubber cushion is applied over and under a substrate to be assembled (e.g., a glass plate) for thermal pressing, so that the sealant is cured upon reaching a specified width. During production of a liquid crystal display device with ball spacers, ball spacers are arranged uniformly between two glass plates to be assembled and up to edges of the glass plates. Once the two glass plates are assembled, a gap remains between glass plates for discharging gas in the panel during assembling, so that the frame seal will not suffer from obvious sealing defects in a thermal pressing process. These defects primarily comprise seal brush and seal narrow.

However, when a liquid crystal display device with post spacers (PS) is subject to the thermal pressing process, even the liquid crystal display device is provided with dummy PS and conventional process dummy seal, defects like seal brush and seal narrow still occur in the VIF process. The main reasons follow. In the process for forming post spacers, the color film (C/F) substrate is subject to an edge bead removal (EBR) process, in which the redundant sealant at a peripheral region of the glass plate is removed. After the process of dummy PS is completed, no sealant remains in an area at a distance of about 1 cm from the edge of substrate. In the thermal pressing process, the edge of the substrate is pressed airtight completely during assembling, so that the gas between two assembled glass plates can not be discharged, thus resulting in seal brush and seal narrow.

SUMMARY

Technical Problem to be Solved

The present disclosure provides a frame seal structure on substrate. The technique in the present disclosure relates to an improvement to the design of the assembly process dummy seal. Particularly, a circle of assembly process dummy seal is arranged between an edge of the substrate and the conventional primary seal, and the position, width, and size of the assembly process dummy seal is redesigned according to production data and experience, so as to solve the problems of seal brush and seal narrow, which are caused by the fact that there is no sealant in the edge area after EBR for the liquid crystal display with PS in the VIF process.

Technical Solutions

To this end, in one aspect, the present disclosure provides a frame seal structure on substrate, comprising a primary seal and an assembly process dummy seal, wherein the assembly process dummy seal is formed in an area between the primary seal and an edge of the substrate and consists of a plurality of sub-seals which are arranged discontinuously.

The distance from the assembly process dummy seal to the edge of the substrate can be 1-5 mm.

The distance from the assembly process dummy seal to the edge of the substrate can be 2 mm.

Openings with a size of 5-6 mm can be formed between two neighboring sub-seals.

In the present frame seal structure, the assembly process dummy seal can have a width of 240-300 μm.

The present frame seal structure can further comprise primary seals which are arranged between the liquid crystal display area and the assembly process dummy seal, and the minimum distance from the assembly process dummy seal to the primary seal can be 5-6 mm.

The primary seal can consist of a plurality of rectangular seals which are regularly arranged between the liquid crystal display area and the assembly process dummy seal.

The primary seal can be a plurality of seals which are parallel with the assembly process dummy seal and arranged regularly between the liquid crystal display area and the assembly process dummy seal, each of the seals being provided with a plurality of openings which correspond in position with the openings in the assembly process dummy seal.

The present frame seal structure can further comprise frame seals which are arranged around the liquid crystal display area, wherein the frame seal comprises a liquid crystal perfusion inlet which extends outside in a straight through manner.

In another aspect, the present disclosure provides a substrate, comprising the above-mentioned frame seal structure. The substrate can be an array substrate.

In yet another aspect, the present disclosure provides a liquid crystal display device, comprising the above-mentioned substrate.

Advantageous Effects

The present frame seal structure is a novel frame seal structure which is proposed with respect to drawbacks of the process dummy seal during assembling with a VIF process in a liquid crystal display device with post spacers. By virtue of the novel frame seal, the peripheral region of the substrate will not be pressed airtight during assembling, so that the gas can not be discharged, which otherwise would lead to poor sealing in a certain area. Thus the present disclosure can solve the problem of poor pressing of frame seal, particularly the problems like seal brush and seal narrow, and can be better adapted to the VIF process and improve the yield.

DETAILED DESCRIPTION OF EMBODIMENTS

Figure 1:
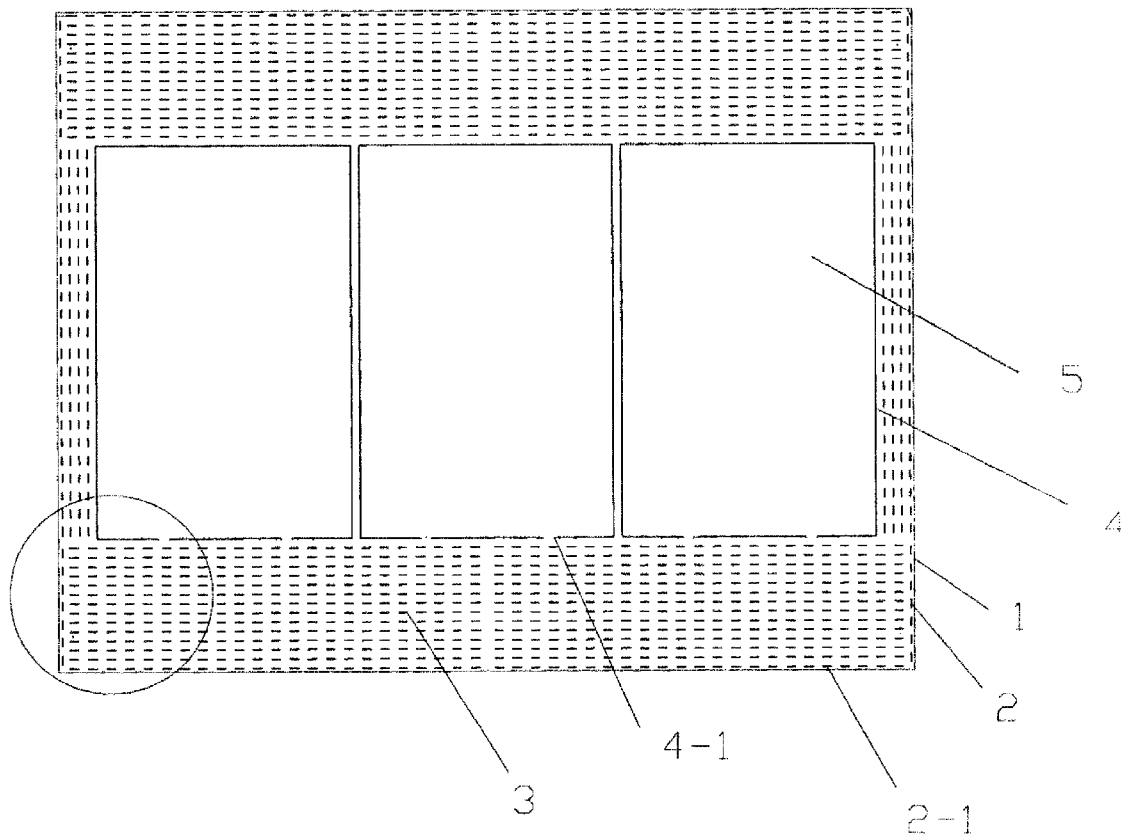
FIG. 1 is a plan view which generally illustrates a frame seal structure on substrate of the present disclosure.

The present disclosure will be elucidated hereinafter in details with reference to the accompanying drawings and embodiments. Apparently, these embodiments only constitute some embodiments of the present disclosure. The scope of the present disclosure is by no means limited to embodiments as set forth herein.

The present disclosure provides a frame seal structure on substrate, and introduces an assembly process dummy seal into the existing frame seal structure. Particularly, the assembly process dummy seal is formed in an area between the primary seal and an edge of the substrate, and consists of a plurality of sub-seals which are arranged discontinuously, thus solving the problem of poor sealing of the liquid crystal display with PS during thermal pressing in the VIF process.

The assembly process dummy seal can be arranged in uniform lines around the substrate, and can form regular patterns, e.g., regular rectangles or lines, or rectangles or lines with local openings.

In order to better facilitate discharging gas between substrates in the thermal pressing process, the present disclosure defines parameters like position and size of the assembly process dummy seal as follow.

For example, a rectangular assembly process dummy seal comprising a plurality of sub-seals which are arranged discontinuously can be formed at a distance of 1-5 mm from the edge of the substrate. The distance from the assembly process dummy seal to the edge of the substrate can further be 2 mm.

Openings with a size of 5-6 mm can be formed between two neighboring sub-seals. With such openings, not only the gas can be discharged, but also the problems like seal brush and seal narrow are solved.

In the present frame seal structure, the assembly process dummy seal has a width of 240-300 µm.

Apart from the assembly process dummy seal, the present frame seal structure can further comprise primary seals which are arranged between the liquid crystal display area and the assembly process dummy seal, and the minimum distance from the assembly process dummy seal to the primary seal can be 5-6 mm, thus guaranteeing that the upper and lower glass substrates will not be pressed airtight completely during assembling.

In the primary seal of the present disclosure which is known in the art, the dummy seal is arranged between the liquid crystal display area and the edge of the substrate. In the present disclosure, since the assembly process dummy seal is provided, the primary seal is arranged between the liquid crystal display area and the assembly process dummy seal. The dummy seal acts to support the upper and lower glass substrates, and to discharge gas smoothly during assembling. The dummy seal can adopt several structures as disclosed in the prior art.

In a solution of the present disclosure, the primary seal can consist of a plurality of rectangular seals which are regularly arranged between the liquid crystal display area and the assembly process dummy seal. Openings can be formed at corresponding positions between neighboring rectangular seals, so that the gas in the panel can be discharged during thermal pressing.

Further, the present primary seal can further be a plurality of seals which are parallel with the assembly process dummy seal and arranged regularly between the liquid crystal display area and the assembly process dummy seal, each of the seals being provided with a plurality of openings which correspond in position with the openings in the assembly process dummy seal. The assembly process dummy seal can be provided with more openings between the liquid crystal display area and the edge of the substrate for discharging gas, thus guaranteeing that the sealant is uniform and the problems like seal brush and seal narrow are avoided after assembling.

Further, the present frame seal structure can further comprise frame seals which are arranged around the liquid crystal display area. The frame seal comprises a liquid crystal perfusion inlet which extends outside in a straight through manner. This can effectively prevent the gas in the panel from discharging through the liquid crystal perfusion inlet during thermal pressing and assembling.

Components are suffixed with reference numerals in this disclosure: 1 substrate; 2 assembly process dummy seal; 2-1 sub-seal; 3 primary sealant; 3-1 sub-seal; 4 frame seal; 4-1 liquid crystal perfusion inlet; and 5 liquid crystal display area.

Embodiment 1

FIG. 1 is a plan view which generally illustrates a frame seal structure on an array substrate in the present disclosure. The frame seal structure comprises a primary seal 3 and an assembly process dummy seal 2. The assembly process dummy seal 2 is formed in an area between the primary seal 3 and the edge of the substrate 1, and consists of a plurality of sub-seal 2-1 which are arranged discontinuously. With the assembly process dummy seal 2 of the present disclosure, the peripheral region of the substrate is not pressed airtight completely during assembling, so that the gas can be discharged and poor sealing does not occur in a certain area, and the problems of poor pressing of frame seal (e.g., seal brush and seal narrow) can be solved. In this manner, the problem of poor sealing of the liquid crystal display with PS during thermal pressing in the VIF process is solved. Here, the assembly process dummy seal 2 is rectangular, and a distance from the assembly process dummy seal 2 to the edge of the substrate 1 is 2 mm.

Figure 2:
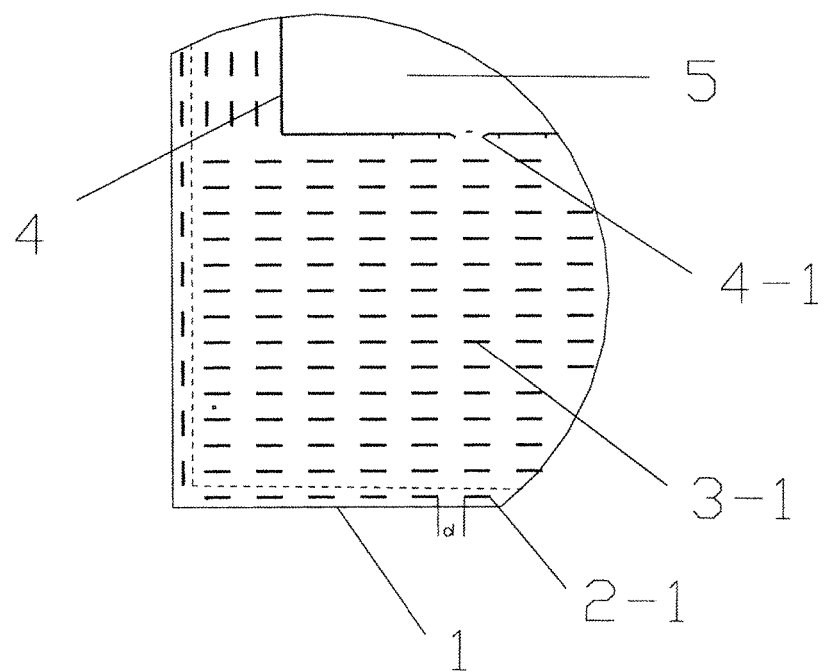
FIG. 2 is an enlarged view illustrating the frame seal structure on substrate of the present disclosure.

FIG. 2 is an enlarged view illustrating the frame seal structure on substrate of the present disclosure, and corresponds to a portion indicated by a circle at the left bottom of FIG. 1. As shown in FIG. 2, openings with a size d of 6 mm are formed between two neighboring sub-seals 2-1. Both the size or width of the openings between assembly process dummy seals and each opening in the present embodiment should at least be 6 mm, so that the upper and lower glass substrates are not pressed towards each other completely during assembling, which otherwise would lead to sealant related defects.

In the present embodiment, the assembly process dummy seal 2 has a width of 280 µm, and the distance from the assembly process dummy seal 2 to the edge of the substrate 1 is 2 mm.

In the present embodiment, the primary seal 3 is arranged between the liquid crystal display area 5 and the edge of the substrate 1, i.e., sealants between the liquid crystal display area 5 and the assembly process dummy seal 2 as indicated by dashed lines. The minimum distance from the assembly process dummy seal 2 and the primary seal 3 is 6 mm, for guaranteeing the upper and lower glass substrates are not presses towards each other completely during assembling.

Particularly, in the present embodiment, the primary seal 3 comprises a plurality of seals which are parallel with the assembly process dummy seal 2 and arranged regularly between the liquid crystal display area 5 and the edge of the substrate 1, and each of the seals is provided with openings which correspond in position with openings in the assembly process dummy seal 2. In this way, more openings for discharging gas are formed between the liquid crystal display area 5 and the edge of the substrate 1, so that the gas can be discharged quickly during assembling, and the upper and lower glass substrates are not pressed towards each other completely, thus avoiding seal brush and seal narrow.

Further, in the present embodiment, the frame seal structure further comprises a frame seal 4 which are arranged around the liquid crystal display area 5. a liquid crystal perfusion inlet 4-1 in the frame seal 4 extends outside in a straight through manner. In this way, it is possible to effectively prevent the gas in the panel from discharging through the liquid crystal perfusion inlet 4-1 during thermal pressing and assembling, thus improving the ability of discharging gas.

Embodiment 2

As compared with Embodiment 1, the difference only lies in that, in the present embodiment, openings with a size d of 5 mm are formed between two neighboring sub-seals 2-1, the assembly process dummy seal 2 has a width of 240 μm, and the distance from the assembly process dummy seal 2 to the edge of the substrate 1 4 mm.

In the present embodiment, the primary seal 3 comprises a plurality of rectangular seals (not shown in figures) which are arranged regularly between the liquid crystal display area 5 and the edge of the substrate 1. Corresponding openings are formed between neighboring rectangular seals for discharging gas in the panel during thermal pressing. The minimum distance from the assembly process dummy seal 2 to the primary seal 3 is 5 mm, thus guaranteeing the upper and lower glass substrates are not pressed towards each other completely during assembling.

Embodiment 3

As compared with Embodiment 1, the difference only lies in that, in the present embodiment, openings with a size d of 6 mm are formed between two neighboring sub-seals 2-1, the assembly process dummy seal 2 has a width of 300 μm, and the distance from the assembly process dummy seal 2 to the edge of the substrate 1 is 2 mm.

In the present embodiment, the minimum distance from the assembly process dummy seal 2 and the primary seal 3 is 6 mm, thus guaranteeing the upper and lower glass substrates are not pressed towards each other completely during assembling.

Embodiment 4

As compared with Embodiment 1, the difference only lies in that, in the present embodiment, the assembly process dummy seal 2 has a width of 260 μm, and the distance from the assembly process dummy seal 2 to the edge of the substrate 1 is 5 mm.

Embodiment 5

As compared with Embodiment 1, the difference only lies in that, in the present embodiment, the assembly process dummy seal 2 has a width of 280 μm, and the distance from the assembly process dummy seal 2 to the edge of the substrate 1 is 1 mm.

Embodiment 6

An array substrate comprises any one of the frame seal structure disclosed in Embodiment 1-5.

Although the present disclosure has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

The invention claimed is:

1. A frame seal structure on a substrate, comprising a primary seal and an assembly process dummy seal,
   wherein the assembly process dummy seal is formed in an area between the primary seal and an edge of the substrate, and consists of a plurality of sub-seals which are arranged discontinuously,
   wherein the primary seal consists of a plurality of sub-seals which are arranged discontinuously, and
   wherein openings between two neighboring sub-seals of the assembly process dummy seal directly face openings between two neighboring sub-seals of the primary seal, and openings between two neighboring sub-seals of the assembly process dummy seal and openings between two neighboring sub-seals of the primary seal form gas discharging passages in a direction perpendicular to a side of the substrate.

2. The frame seal structure of claim 1, wherein the distance from the assembly process dummy seal to the edge of the substrate is 1-5 mm.

3. The frame seal structure of claim 2, wherein the distance from the assembly process dummy seal to the edge of the substrate is 2 mm.

4. The frame seal structure of claim 1, wherein the openings between two neighboring sub-seals of the assembly process dummy seal has a size of 5-6 mm.

5. The frame seal structure of claim 4, wherein the assembly process dummy seal has a width of 240-300 μm.

6. The frame seal structure of claim 1, wherein the minimum distance from the assembly process dummy seal to the primary seal is 5-6 mm.

7. The frame seal structure of claim 1, wherein the primary seal consists of a plurality of rectangular seals which are regularly arranged between the liquid crystal display area and the assembly process dummy seal.

8. The frame seal structure of claim 1, wherein the primary seal is a plurality of seals which are parallel with the assembly process dummy seal and arranged regularly between the liquid crystal display area and the assembly process dummy seal, openings in each of the seals corresponding in position with the openings between two neighboring sub-seals of the assembly process dummy seal.

9. The frame seal structure of claim 1, further comprising frame seals which are arranged around the liquid crystal display area, wherein the frame seal comprises a liquid crystal perfusion inlet which extends outside in a straight through manner.

10. A substrate, comprising the frame seal structure of claim 1.

11. A liquid crystal display device, comprising the substrate of claim 10.

* * * * *